United States Patent [19]

Klotz et al.

[11] Patent Number: 4,959,043
[45] Date of Patent: Sep. 25, 1990

[54] MULTI-PINION DIFFERENTIAL ASSEMBLY

[75] Inventors: James R. Klotz, Mt. Clemens; Steven A. Mikel, Farmington Hills; John A. Frait, Walled Lake; Berthold Martin, Utica, all of Mich.

[73] Assignee: Chrysler Corporation, Highland Park, Mich.

[21] Appl. No.: 400,203

[22] Filed: Aug. 29, 1989

[51] Int. Cl.⁵ .............................................. F16H 1/38
[52] U.S. Cl. ..................................... 475/230; 475/220
[58] Field of Search .................... 74/710, 710.5, 713; 75/220, 230

[56] References Cited

U.S. PATENT DOCUMENTS

| | | | |
|---|---|---|---|
| 1,472,629 | 10/1923 | Boomsliter | 74/713 |
| 3,115,790 | 12/1963 | Cornish et al. | 74/713 |
| 3,323,388 | 6/1967 | Snoy et al. | 74/710 |
| 3,444,960 | 5/1969 | Killius et al. | 74/710.5 |
| 4,084,450 | 4/1978 | Conroy | 74/713 X |
| 4,414,859 | 11/1983 | Holthoff | 74/417 |
| 4,577,530 | 3/1986 | Hickey | 74/713 |
| 4,622,052 | 5/1987 | Draper | 29/401.1 |
| 4,732,052 | 3/1988 | Dewald | 74/711 |
| 4,733,578 | 3/1988 | Glaze et al. | 74/713 |
| 4,741,407 | 5/1988 | Torii et al. | 180/76 |
| 4,747,322 | 5/1988 | Orain | 74/715 |
| 4,751,853 | 7/1988 | Dissett | 74/715 |
| 4,754,661 | 7/1988 | Barnett | 74/459.5 |
| 4,815,337 | 3/1989 | Peloquin | 74/710.5 X |

FOREIGN PATENT DOCUMENTS

| | | | |
|---|---|---|---|
| 58-137643 | 8/1983 | Japan | 74/713 |
| 255952 | 7/1926 | United Kingdom | 74/713 |
| 776200 | 6/1957 | United Kingdom | 74/713 |
| 1252520 | 11/1971 | United Kingdom | 74/713 |

*Primary Examiner*—Dwight Diehl
*Attorney, Agent, or Firm*—Edward P. Barthel

[57] ABSTRACT

A differential gear assembly has a multi-pinion system with a unitary spider to enable assembly of the differential gear by an automated process.

2 Claims, 3 Drawing Sheets

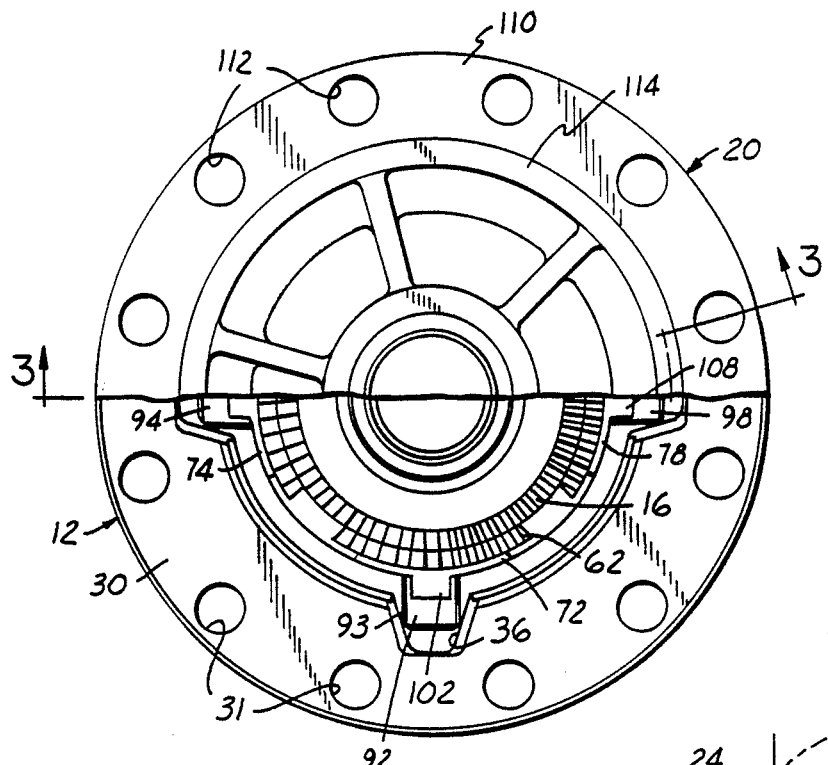
FIG.2
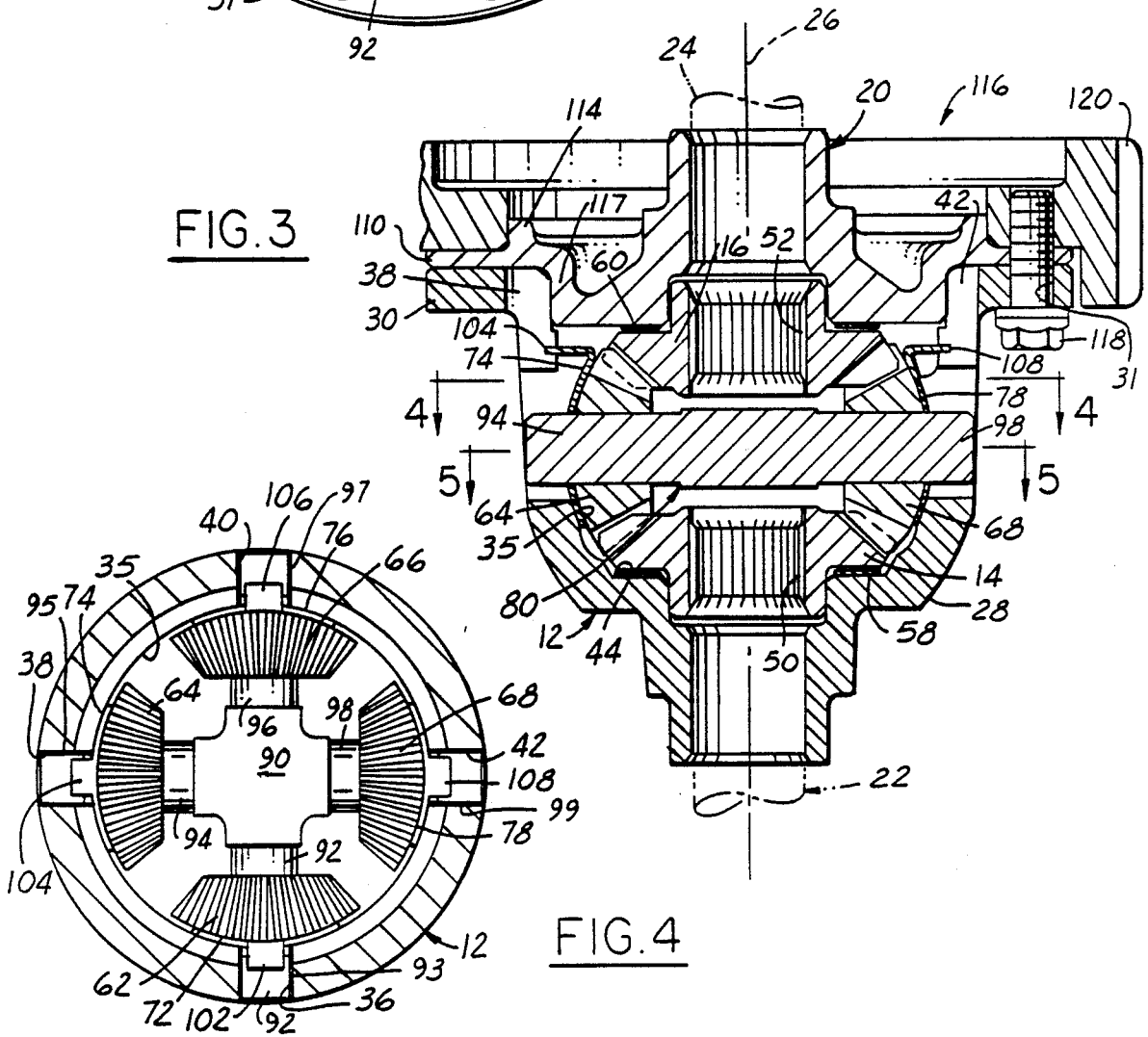
FIG.3
FIG.4

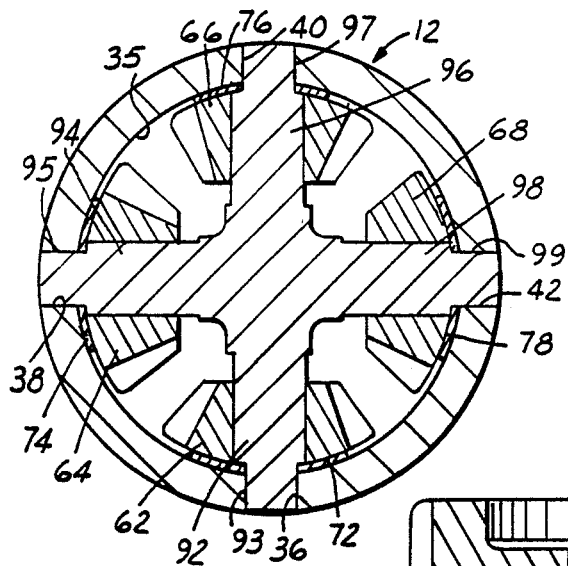
FIG.5
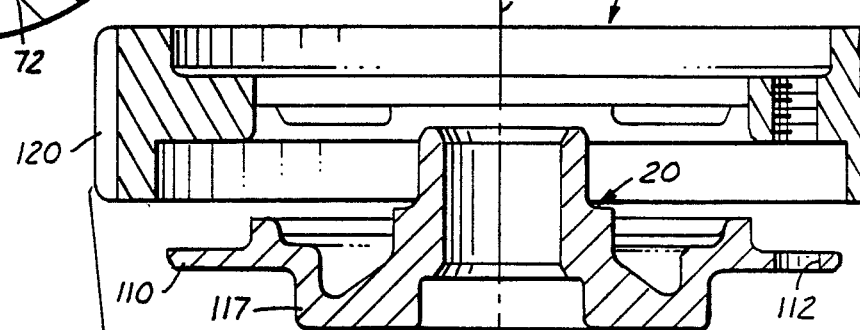
FIG.6
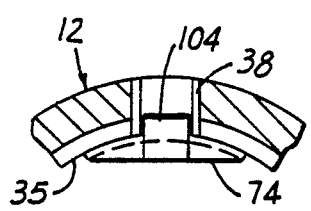
FIG.7
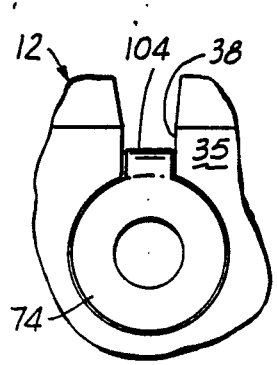
FIG.8
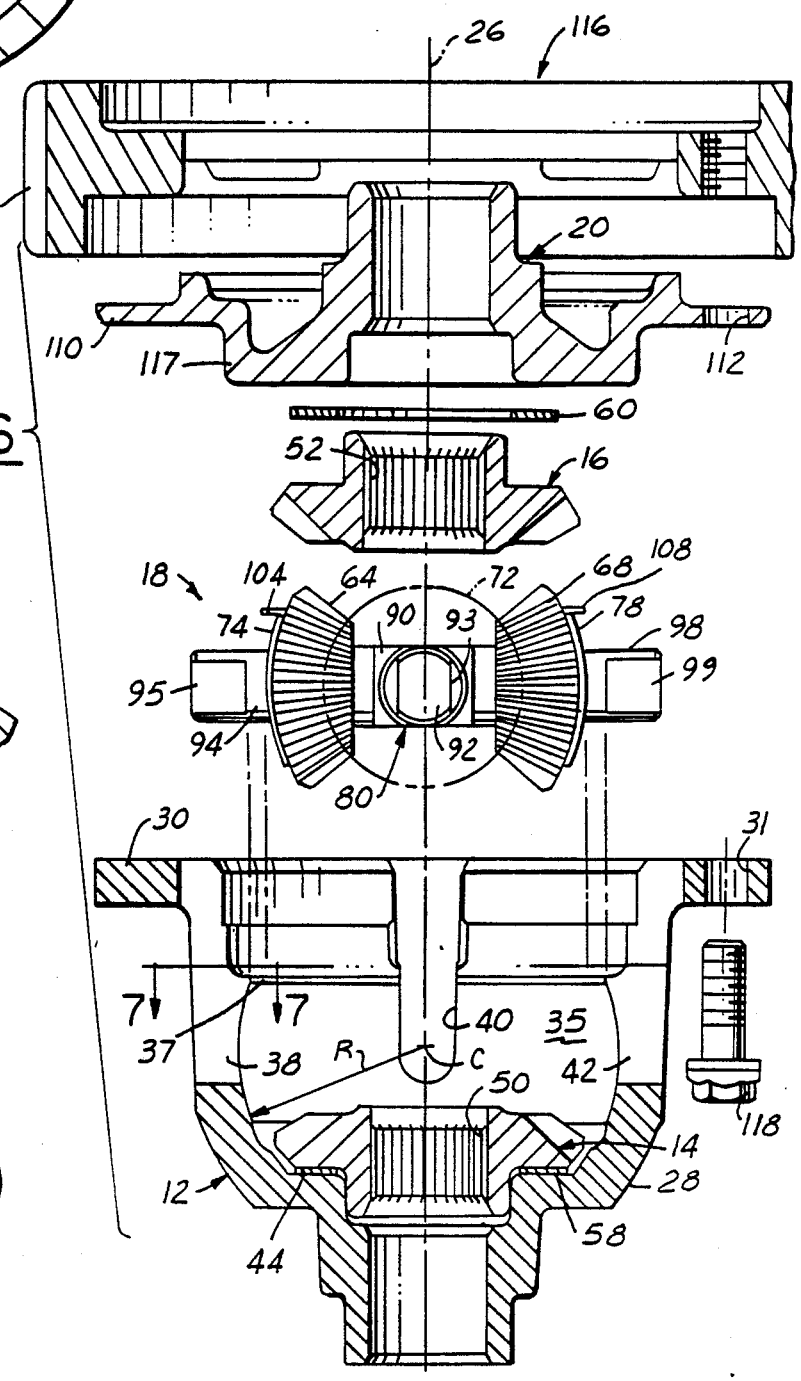

MULTI-PINION DIFFERENTIAL ASSEMBLY

BACKGROUND AND SUMMARY OF THE INVENTION

The present invention relates to differential gear assemblies and, more particularly, to multi-pinion differential gear assemblies.

When a differential gear assembly is required to have only a moderate torque transmission capability, a two pinion gear system will generally be utilized and perform satisfactorily. In a two pinion gear system, generally there is a single shaft which mounts the two opposing pinion gears in meshing engagement with and between a pair of side gears.

When a differential gear assembly is required to transmit a substantially increased amount of torque, generally a four pinion gear assembly is generally required. The four pinion gear assembly distributes the torque over the four pinion gears to reduce tooth stress load on the gears. In a four pinion gear system, generally there are two shafts which mount the two opposing pairs of pinion gears in a meshing arrangement between a pair of side gears. While the four pinion gear system transmits increased torque, there is a difficulty in assembling the four pinion differential gear assembly by automated processes.

Four pinion gear differential gear assemblies generally require a pair of shafts and a split casing to enable the four pinion gears to be assembled into the casing. This is a very labor intensive operation and adds a significant cost to the manufacturing of the four pinion differential gear. Also, the split casings are prone to misalignment during assembly.

Accordingly, there is a need in the field for a four pinion differential gear assembly which may be easily assembled by automated processes. The present invention provides the art with such a device.

The present invention provides the art with a differential gear assembly having a unitary shaft mechanism which maintains all pinion gears thereon enabling simultaneous insertion of all the pinion gears into the differential gear casing. The present invention provides the art with a differential gear casing which includes elongated slots which mount the shaft mechanism along with providing lubrication access into the differential casing to lubricate the side and pinion gears therein. The casing also provides the art with an abutting surface which supports spherical thrust washers which provide bearing surfaces The abutting surface has a substantially spherical curvature which lends itself to be manufactured by an uninterrupted machining operation. Also, a multi-pinion gear assembly is provided which enables the pinion gears to center within the differential gear seeking their own backlash From the following detailed description taken in conjunction with the accompanying drawings and subjoined claims, other objects and advantages of the present invention will become apparent to those skilled in the art.

BRIEF DESCRIPTION OF THE DRAWINGS

FIG. 2 is an end elevation view of the assembled differential gear assembly of FIG. 1 with portions thereof when away.

FIG. 3 is a cross-section view of the differential gear assembly of FIG. 2, the section being taken along line 3—3 thereof.

FIG. 4 is a cross-section view of the differential gear assembly of FIG. 3, the section being taken along line 4—4 thereof.

FIG. 5 is a cross-section view of the differential gear assembly of FIG. 3, the section being taken along line 5—5 thereof.

FIG. 6 is an exploded cross-section view of a differential gear assembly in accordance with the present invention showing portions thereof just prior to assembly.

FIG. 7 is a fragmentary cross-section view of the differential gear assembly shown in FIG. 6 showing a top plan view of a washer in assembled relationship to the housing in accordance with the present invention.

FIG. 8 is a side elevation view of the assembled washer shown in FIG. 7 all in accordance with the present invention.

DETAILED DESCRIPTION OF THE PREFERRED EMBODIMENT

Figure 1:
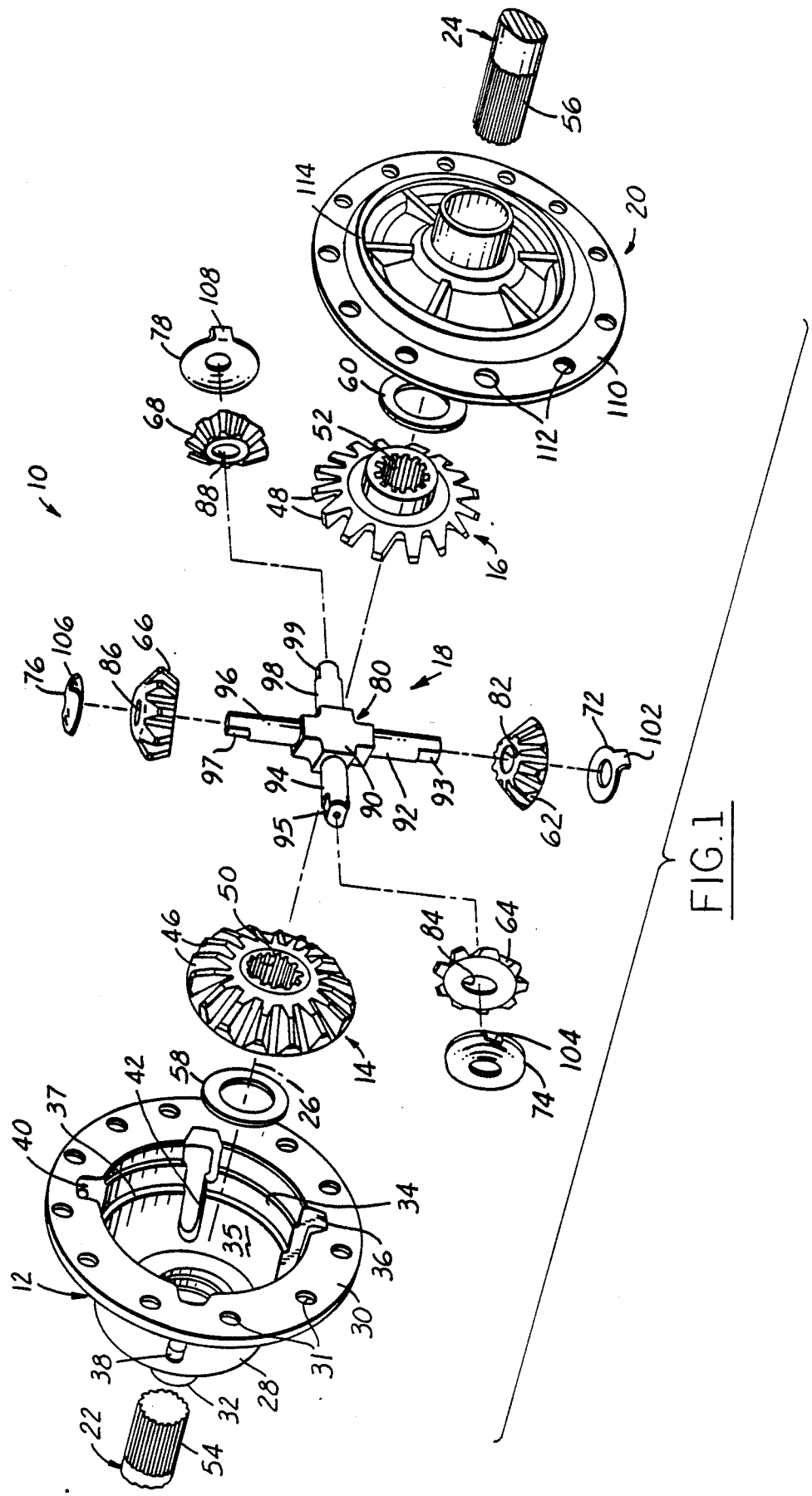
FIG. 1 is an exploded perspective view of a differential gear assembly in accordance with the present invention.

Referring to the figures, particularly FIG. 1, an exploded perspective view of a differential gear assembly is shown and designated with the reference numeral 10. The differential gear assembly 10 generally includes a casing 12, a pair of side gears 14 and 16, a pinion system 18, and a cover plate 20. In use, the side gears 14 and 16 are coupled with axle shafts 22 and 24, respectively.

The casing 12 is rotatable about a longitudinal axis 26 and generally includes a bell-shaped hub 28 with a peripheral flange 30 at its enlarged open end and a shaft housing 32 at its narrowed closed end. The shaft housing 32 enables the shaft 22 to enter into the casing 12 to couple with the side gear 14.

The hub 28 is hollow, having an interior surface 34, The interior surface 34 includes a portion 35 which has a substantially spherical curvature defined by a radius of curvature "R" radiating from its center of curvature "C" on the longitudinal axis 26 and provides a substantially spherical abutting surface for the pinion gear washers, as best seen in FIGS. 3 and 5. A plurality of elongated slots 36, 38, 40 and 42 are positioned at 90° increments about the periphery of the hub 28. The slots 36, 38, 40 and 42 are longitudinally formed in the casing 12 from the flange 30 and run axially along the hub 18 towards the casing base 44 of the hub 28. The slots 36, 38, 40 and 42 are angled at the flange 30, as seen in FIG. 2, to provide a pilot for the pinion system 18 and to collect oil into the casing to lubricate the pinion system 18. The flange 30 includes a plurality of apertures 31 to enable fasteners to pass therethrough to secure the plate 20 with the casing 12.

The side gears 14 and 16 are generally beveled gears and include teeth 46 and 48 and have splined bores 50 and 52 which mesh with the splines 54 and 56 on shafts 22 and 24, respectively. Also, bearing washers 58 and 60 provide friction surfaces for the side gears 14 and 16 against the casing base 44 and cover 20, respectively, as seen in FIG. 3.

The illustrated pinion system 18 includes four pinion gears 62, 64, 66 and 68, four bearing washers 72, 74, 76 and 78, and a unitary pinion spider 80. The pinion gears 62, 64, 66 and 68 are beveled gears having smooth bores 82, 84, 86 and 88 therein.

The pinion spider 80 includes a cross head member 90 and four unitary cross stub pins 92, 94, 96 and 98. The pins are arranged in coaxial pairs at 90° spaced intervals. The cross stub pins 92, 94, 96 and 98 have flattened end portions which define shoulders 93, 95, 97 and 99. The flattened end portions are designed to be received within the slots 36, 38, 40 and 42, to aid in properly positioning the pinion system therein while the shoulders operate to prevent lateral movement of the gears pinion spider and to increase surface area to prevent metal displacement of the casing at the slots 36, 38, 40 and 42, as seen in FIGS. 2, 4 and 5. The pinion gears 62, 64, 66 and 68 along with their bearing washers 72, 74, 76 and 78 are positioned onto the cross stub pins 92, 94, 96 and 98, respectively, prior to insertion of the pinion system 18 into the casing 12. The unitary spider 80 enables all four of the pinion gears along with the bearing washers to be positioned onto the spider for simultaneous insertion of the gears and washers into the casing.

The washers 72, 74, 76 an 78 have a concave body with extending tabs 102, 104, 106 and 108. The concave interior surfaces of the washers 72, 74, 76 and 78 provide a bearing surface for the pinion gears 62, 64, 66 and 68. The tabs 102, 104, 106 and 108 are received into the slots 36, 38, 40 and 42 and operate to prevent relative rotation between the washers 72, 74, 76 and 78 and casing 12. The outer surfaces of the washers 72, 74, 76 and 78 are conformed to abut the spherical surface 35, as seen in FIGS. 3, 7 and 8.

While the present invention illustrates a four pinion gear system, it should be appreciated that the present pinion gear system may include three, five, six or more pinion gears. Depending upon the size of the hub and the desired number of pinion gears necessary to carry the load, the number of slots in the hub, the number of stub pins extending from the unitary spider as well as the number of bevel gears and spherical washers will be added accordingly. Thus, it is possible to utilized the present invention with three or more pinion gears.

The cover plate 20 includes a peripheral flange 110 having a plurality of apertures 112 to enable securement of the casing 12 and end plate 20 together. The apertures 112 are strategically positioned about the flange 110 such that the fasteners are positioned adjacent to the slots 36, 38, 40 and 42 to provide strength to the flange. The end plate 20 also includes an axially extending circular lip flange 114 having a diameter size to concentrically seat a ring gear 116 thereon which is secured to the differential gear by cap screws 118, as best seen in FIG. 3. The ring gear 116 has its teeth 12 engageable to a drive gear (not shown) or an output shaft of a transmission. Also, a circular pilot flange 117 axially extends from the plate 20 opposing the flange 114. The pilot flange 117 has a diameter size to seat within the casing cavity to provide alignment of the plate 20 with the casing 12 which, in turn, provides alignment of the ring gear 116.

Generally, during assembly of the differential gear assembly 10, the casing 12 is provided and the side gear 14 and washer 58 are positioned within the casing 12. Also, the pinion spider pins 92, 94, 96 and 98 are loaded with the four pinion gears 62, 64, 66 and 68 and washers 72, 74, 76 and 78. The pinion system 18 is then positioned into the casing 12 such that the flattened end portions of pins 92, 94, 96 and 98 are inserted into the slots 36, 38, 40 and 42 to mount the pinion system 18 thereon.

As the pinion system 18 is loaded into the casing 12, the gears 62, 64, 66 and 68 and washers 72, 74, 76 and 78 move axially inwardly on the pins 92, 94, 96 and 98 toward the cross-head member 90 to pass by interior hub lip 37. Then, once the gears 62, 64, 66 and 68 are passed the interior hub lip 37 and within the spherical surface portion 35 of the hub 28, the gears 62, 64, 66 and 68 and washers 72, 74, 76 and 78 are moved axially outward along the pins 92, 94, 96 and 98 as the pinion gears 62, 64, 66 and 68 mesh with beveled side gear 14 until the washers 72, 74, 76 and 78 contact the spherical surface 35 of the casing 12.

The tabs 102, 104, 106 and 108 of the washers 72, 74, 76 and 78 are trapped within the slots 36, 38, 40 and 42 to position the washers 72, 74, 76 and 78 against rotation on the spherical surface portion 35, as illustrated in FIGS. 3, 4, 7 and 8. Also, the tabs 102, 104, 106 and 108 are of such a length that as the washers move inwardly and outwardly the tabs 102, 104, 106 and 108 do not disengage from the slots 36, 38, 40 and 42. Thus, the pinion gears 62, 64, 66 and 68 will bear on the concave washers 72, 74, 76 and 78 which, in turn, will abut the spherical surface 35.

Next, side gear 16 along with washer 60 are positioned within the casing 1 and the end plate 20 is assembled thereto such that pilot flange 117 seats within the casing cavity and flange apertures 112 are aligned with casing flange apertures 31. The ring gear 116 is positioned such that its apertures are aligned with the apertures 31 and 112 of the casing 12 and end plate 20 such that the cap screws 118 may be inserted therethrough and into threaded engagement with the bores provided in ring gear 116 to secure the differential gear casing, plate and ring gear together such that the plate 20 does not carry a torque load, as seen in FIG. 3.

The differential gear assembly of the present invention enables the pinion gears 62, 64, 66 and 68 to center within the casing 12 to establish their own backlash with the side gears 14 and 16. Also, the slots 36, 38, 40 and 42 provide lubrication to the interior of the casing 12 by enabling transmission oil from the outer housing to enter into the casing 12 to lubricate the gears therein. Thus, as may now be appreciated, by providing loading of all the pinion gears and washers onto a single spider and dropping the loaded spider into the casing, the invention provides a four pinion differential gear assembly that may be easily assembled by automated processes.

While the above describes the preferred embodiment of the present invention, it will be understood that the present invention is susceptible to modifications, variations and alterations without deviating from the scope and fair meaning of the subjoined claims.

What is claimed is:

1. A differential gear assembly comprising:
a pair of axially aligned axle shafts with their adjacent inner end portions extending into a hollow casing which is rotated about a longitudinal axis aligned with the shaft axis:
said casing having a bell-shaped hub formed with a base at its lower end and an axially opposite enlarged upper exterior open end having a predetermined internal diameter concentrically disposed about said longitudinal axis, said upper open end defined by a peripheral radial flange, said casing hub defining an internal surface formed with a central internal surface portion thereof having a substantially uninterrupted spherical curvature symmetrically disposed about said longitudinal axis, said central internal spherical surface portion having its center of curvature on said longitudinal axis so as to be defined by a radius of curvature radiating from said center of curvature, said central internal spherical surface portion defining an interior hub lip forming a central internal access opening concentric with and spaced an axial axis distance below said exterior upper open end, said central internal access opening positioned a predetermined distance above said center of curvature and having an internal diameter a predetermined dimension smaller than said exterior upper open end internal diameter;

said casing hub formed with at least three uniformly spaced elongated through slots having an upper open end and a closed lower end, each said slot having its open upper end in said radial flange and extending vertically downwardly a predetermined axial extend such that each said slot closed lower end terminates in said central internal surface portion intermediate said center of curvature and said casing bell-shaped hub base;

a pair of upper and lower bevel side gears adapted to be positioned in spaced opposed relationship within said casing hub and symmetrically disposed with respect to a horizontal plane that includes said central internal spherical surface portion center of curvature, such that said upper and lower bevel side gears are rotatable about said longitudinal axis;

an integrally formed one-piece pinion spider having at least three uniformly spaced stub pins of predetermined radial dimension, each said stub pin vertically located in an associated one of said slots with its principal axis positioned substantially in said horizontal plane intermediate each said slot upper open end and closed lower end, whereby oil is free to flow through each said slot both above and below its associated stub pin providing lubrication to the interior of said casing;

at least three symmetrically spaced bevel pinion gears with each pinion gear slidably positioned on an associated stub pin of said spider to a predetermined radially innermost initial pinion gear assembly position contacting an inner stop shoulder on its associated stub pin, and with each said spider stump pin inserted in an associated axial slot upper open end enabling said pinion gears to pass vertically downwardly through said interior hub lip central internal access opening after fitting through said casing upper open end;

and thereafter each said pinion gear subsequently sliding radially outwardly from its stop shoulder in a gravity induced manner on its associated stub pin a predetermined distance so as to assume an axially floating working position, wherein each said pinion gear is in meshing engagement with said pair of opposed upper and lower bevel side gears such that said pinion gears are free to seek their own backlash therewith; and end cover plate having a peripheral flange, means securing said peripheral flange to said casing upper open end radial flange and cooperating therewith to retain said bevel side gears, said bevel pinion gears and said cross-shaft spider in assembled relationship with said casing hub; and concave bearing washers positioned between each said pinion gear and said hub central spherical surface portion, each said washer outer periphery formed with a radially outwardly extending positioning tab of predetermined radial length so as to be received in the upper open end of an associated axial slot during initial installation of said spider and pinion gears, each said tab being trapped against disengagement from its associated axial slot with said pinon gears in their working position thereby preventing relative rotation between each said washer and said casing hub central spherical portion.

2. The differential gear according to claim 1, wherein each said stub pin has flattened end portions which define diametrically opposed shoulders received within its associated slot so as to centrally position said pinion spider in said casing while obviating metal displacement of said casing slots by their associated stub pins.

* * * * *